United States Patent

Coenen et al.

(10) Patent No.: US 8,050,470 B2
(45) Date of Patent: Nov. 1, 2011

(54) BRANCH EXTENSION METHOD FOR AIRWAY SEGMENTATION

(75) Inventors: Bjoern E Coenen, Munich (DE); Atilla Peter Kiraly, Plainsboro, NJ (US); Carol L. Novak, Newtown, PA (US); Benjamin Odry, West New York, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1185 days.

(21) Appl. No.: 11/565,720

(22) Filed: Dec. 1, 2006

(65) Prior Publication Data

US 2007/0127800 A1    Jun. 7, 2007

Related U.S. Application Data

(60) Provisional application No. 60/742,968, filed on Dec. 7, 2005.

(51) Int. Cl.
*G06K 9/00* (2006.01)
(52) U.S. Cl. .......................... 382/128; 382/173
(58) Field of Classification Search .............. 382/128, 382/131, 132, 173
See application file for complete search history.

(56) References Cited

U.S. PATENT DOCUMENTS

| | | | |
|---|---|---|---|
| 7,116,810 B2 | 10/2006 | Miller et al. | |
| 7,194,117 B2 * | 3/2007 | Kaufman et al. | 382/128 |
| 2005/0196024 A1 * | 9/2005 | Kuhnigk | 382/128 |
| 2005/0207630 A1 | 9/2005 | Chan et al. | |
| 2006/0025674 A1 | 2/2006 | Kiraly et al. | |
| 2006/0030958 A1 | 2/2006 | Tschirren et al. | |
| 2006/0159328 A1 | 7/2006 | Vaz et al. | |

OTHER PUBLICATIONS

Kiraly et al., "Three-dimensional Human Airway Segmentation Methods for Clinical Virtual Bronchoscopy," Academic Radiology, vol. 9, No. 10, pp. 1153-1168, Oct. 2002.*
A. P. Kiraly, et al., "Three-Dimensional Human Airway Segmentation Methods for Clinical Virtual Bronchoscopy", Academic Radiology, 2002, 9(10): p. 1153-1168.
C. I. Fetita, et al., "Pulmonary Airways: 3-D Reconstruction from Multislice CT and Clinical Investigation". vol. 23, No. 11, IEEE Trans. Medical Imaging, Nov. 2004.
D. Aykac, et al., "Segmentation and Analysis of the Human Airway Tree from Three-Dimensional X-Ray CT Images", IEEE Trans. Medical Imaging, 22(8) 940-950, Aug. 2003.
J. Tschirren "Intrathoracic Airway Trees: Segmentation and Airway Morphology Analysis From Low-Dose CT Scans", IEEE Trans. on Med. Imaging, vol. 24, No. 12, Dec. 2005.
D. Bartz, et al., "Hybrid Segmentation and Exploration of the Human Lungs", IEEE Visualization, 2003.
T. Schlatholter, et al., "Simultaneous Segment and Tree Reconst of the Airways for Virtual Bronchoscopy", Image Proc., vol. 4684 of SPIE Med. Imaging (2002) 103-113.
J K. Udupa, et al., "Fuzzy Connectedness and Image Segmentation", Proceedings of the IEEE, vol. 91, No. 10, Oct. 2003.
A. P. Kiraly, et al., "Three-Dimensional Path Planning for Virtual Bronchoscopy", IEEE Transactions of Medical Imaging, vol. 23, No. 1, Nov. 2004, p. 1365-1379.

* cited by examiner

*Primary Examiner* — John Strege

(57) ABSTRACT

A branch extension method and system for segmenting airways in 3D image data is disclosed. An initial airway segmentation is obtained from the 3D image data. Terminal branches of segmented airways of the initial airway segmentation are identified. The segmentation of the terminal branches is then extended. The segmentation of the terminal branches can be extended using various segmentation techniques. This method can use complex segmentation techniques to extend the terminal branches without having a large impact to the overall speed of the segmentation.

26 Claims, 5 Drawing Sheets

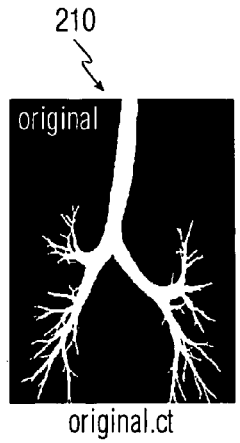
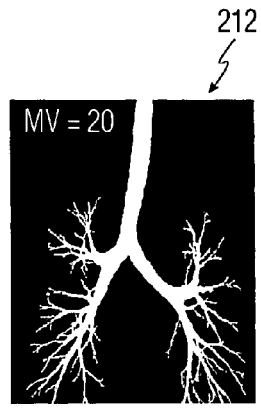
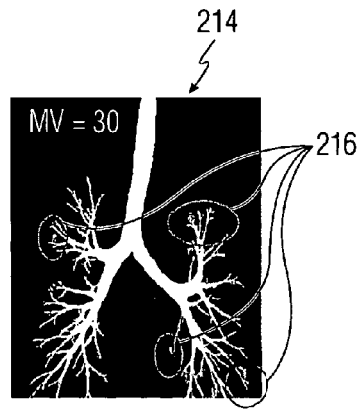
FIG. 2A    FIG. 2B    FIG. 2C
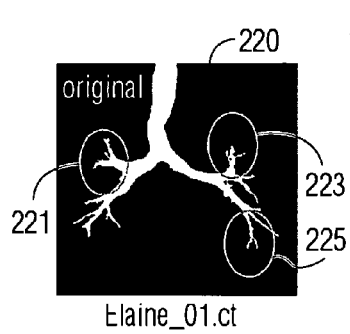
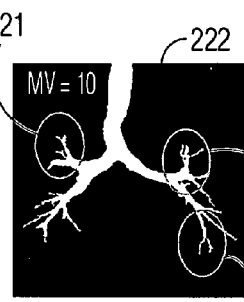
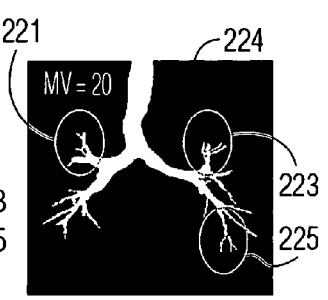
FIG. 2D    FIG. 2E    FIG. 2F
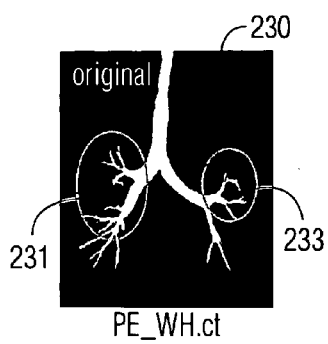
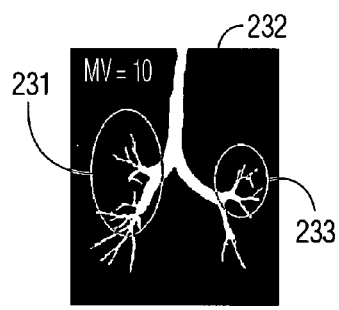
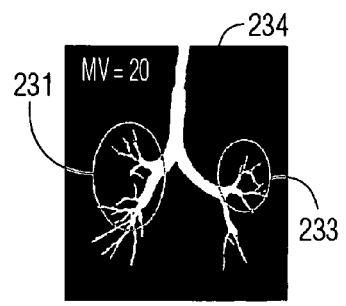
FIG. 2G    FIG. 2H    FIG. 2I

BRANCH EXTENSION METHOD FOR AIRWAY SEGMENTATION

This application claims the benefit of U.S. Provisional Application No. 60/742,968 filed Dec. 7, 2005, the disclosure of which is herein incorporated by reference.

BACKGROUND OF THE INVENTION

The present invention relates to segmenting airways in 3-dimensional medical images, and more particularly to a system and method for extending branches of segmented airways in computed tomography (CT) lung images.

Computed tomography (CT) is a medical imaging method whereby digital geometry processing is used to generate a three-dimensional image of the internal features of a patient from X-ray beams. Such CT imaging results in CT volume data which is a virtual representation of internal anatomical features of a patient. The CT volume data consists of multiple slices, or two-dimensional images, that can be combined to generate a three dimensional image. CT imaging is particularly useful because it can show several types of tissue including lung, bone, soft tissue and blood vessels, with great clarity. Accordingly, such imaging of the body can be used to diagnose problems such as cancers, cardiovascular disease, infectious disease, trauma and musculoskeletal disorders.

The respiratory system starts at the nose and mouth and continues through the airways to the lungs. The largest airway is the windpipe (trachea), which branches into two smaller airways: the left and right bronchi, which lead to the two lungs. The bronchi themselves divide many times before branching into smaller airways (bronchioles). These airways get progressively smaller as they branch out, until they are smaller than a millimeter in diameter. The airways appear as small tubular objects in CT data sets. Segmentation of the airways within CT images can be a difficult problem due to noise and partial volume effects.

Various conventional methods have been proposed for airway segmentation. All such conventional methods either lack speed, require manual input from a user, or have limited ability to obtain a detailed segmentation by reaching the smallest airways. All of these issues can be limiting factors in clinical applications.

BRIEF SUMMARY OF THE INVENTION

The present invention is directed to a system and method for extending branches of an airway segmentation. The present invention provides a branch extension method in which an initial quickly-computed airway segmentation is augmented by a more accurate, although potentially slower segmentation method. According to an aspect of the present invention, specific points in the initial segmentation are targeted for extension by identifying terminal branches of the airways segmented in the initial airway segmentation.

According to an embodiment of the present invention, 3D image data including segmented airways is obtained. The 3D image data including the segmented airways may be obtained by segmenting airways in received 3D image data or loading a previous airway segmentation. Terminal branches of the segmented airways are then identified in the 3D image data. This can be achieved by generating a distance map of the segmented airways from the trachea or generating a tree model of the segmented airways. The segmentation of the terminal branches is then extended. Various segmentation methods including adaptive region growing, differential adaptive region growing, fuzzy connectedness, and branch tracking can be used for the branch extension.

According to another embodiment of the present invention, airways can be segmented in 3D image data using a first segmentation technique. Terminal branches of the airways segmented using the first segmentation technique are then identified. The identified terminal branches are then extended using a second segmentation technique. It is possible that the first segmentation technique segments the airways quickly, and the second segmentation technique is more accurate and slower than the first segmentation technique.

These and other advantages of the invention will be apparent to those of ordinary skill in the art by reference to the following detailed description and the accompanying drawings.

BRIEF DESCRIPTION OF THE DRAWINGS

FIG. 2 illustrates exemplary segmentation results achieved using adaptive region growing branch extension

DETAILED DESCRIPTION OF EXEMPLARY EMBODIMENTS

The present invention is directed to extending branches of segmented airways in 3D image data. As used herein the term 3D image data refers any type of 3-dimensional imaging modalities, including but not limited to Computed Tomography (CT), Magnetic Resonance Imaging (MRI), Positron Emission Tomography (PET), Single Photon Emission Computed Tomography (SPECT), 3D ultrasound (US), etc.

Figure 1:
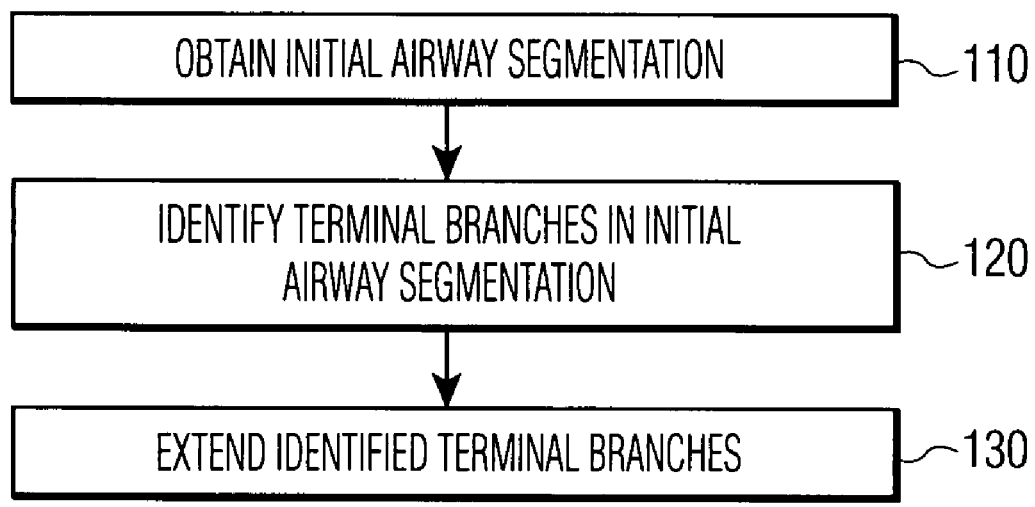
FIG. 1 illustrates a branch-extension method for airway segmentation according to an embodiment of the present invention.

FIG. 1 illustrates a branch-extension method for airway segmentation according to an embodiment of the present invention. At step 110, an initial airway segmentation is obtained. An airway segmentation is 3D image data in which airways have been extracted. The initial airway segmentation can be obtained by extracting the airways from a 3D image dataset. This segmentation of the airways can be achieved using any standard segmentation technique. It may be preferable to use a technique capable of segmenting the airways quickly and robustly. For example, the airways can be segmented automatically from input 3D image data through automated trachea identification in the 3D image data followed by filtered adaptive region growing. The initial airway segmentation can also be obtained by loading a stored 3D image data in which the airways have previously been segmented.

At step 120, terminal branches of the segmented airways are identified in the initial airway segmentation. Various methods can be used to identify the terminal branches. For example, any tree modeling method can produce a complete tree model of the segmented airways to identify the terminal branches. With this method, the centerlines of a branching tubular structure are determined along with the branch points. Methods based on obtaining the skeleton of the segmented data followed by refinement can accomplish these tasks. However, obtaining a full tree model may be time consuming and unnecessary for determining the terminal branches. Depending on the segmentation method used for the branch extension, falsely identified branches can be acceptable as long the true branches are identified as well. For example, it is possible to use a distance map from the trachea in order to quickly estimate locations of the terminal branches. Using the distance map from the trachea, locally maximal distance regions are determined, and the locally maximal distance regions are identified as potential terminal branches, Although many of the potential terminal branches are false, the true terminal branches are captured as well.

At step 130, the identified terminal branches of the airway segmentation are extended. Extending the terminal branches of the airway segmentation refers to further segmenting the terminal branches of the airways from the 3D image data starting at each of the identified terminal branches. The branch extension can be performed using a more complex and time consuming technique than the initial airway segmentation. This is because the area of application of the branch extension is limited to a well-defined region, Furthermore, the airways to be segmented during the branch extension are considerably smaller than those at the trunk of the tree. Hence, since only smaller objects need to be identified, no scale parameters need to be adjusted to handle both large and small objects. Since the potentially complex segmentation methods used for the branch extension are limited to specific regions of interest (at the terminal branches) and smaller variances of the size of the object being segmented, there is less impact on speed than if a method of similar complexity were used to segment the entire airway tree.

The branch extension can be performed at each identified terminal branch using various segmentation methods. Since the identified terminal branches may include false branches, the segmentation method used to implement the branch extension should be robust in dealing with false branches. For example, segmentation methods such as adaptive region growing, differential adaptive region growing, fuzzy connectedness, and branch tracking can be used to extend the terminal branches in the airway segmentation. These methods are described in greater detail below.

In an adaptive region growing branch extension algorithm, two thresholds are used to determine if a voxel is added to the segmentation. All connected voxels to the seed point (at the terminal branch) that satisfy the thresholds are added. In order for a candidate voxel to be added to the segmentation, the gray value of the candidate voxel must be between the thresholds. The algorithm can use an automatic method for determining the upper threshold. The lower threshold is set to the lowest possible value in the image in the case of CT data. The upper threshold is determined by the maximal value at which the segmentation volume remains below a preset maximal volume (MV). Any segmentation beyond this volume is considered an error and results in a lower threshold. It is also possible that directionality and filtering can be taken into account when using the adaptive region growing algorithm.

FIG. 2 illustrates exemplary segmentation results achieved using adaptive region growing branch extension. As illustrated in FIG. 2, images 210, 220, and 230 show Maximum Intensity Projections (MIPs) of initial airway segmentations for three different 3D image datasets. These initial airway segmentations 210, 220, and 230 were obtained by filtered adaptive region growing. Images 212, 214, 222, 224, 232, and 234 show the results of branch extension from images 210, 220, and 230, respectively, using adaptive region growing. The maximal volume (MV) in $mm^3$ is shown for each of the branch extension result images 212, 214, 222, 224, 232, and 234. Images 212 and 214 show the branch extension results for image 210 using an MV of 20 $mm^3$ and 30 $mm^3$, respectively. Image 214 shows that some leakage 216 occurs in this image when the MV of 30 $mm^3$ is used. In image 220, terminal branches 221, 223., and 225 are identified. Images 222 and 224 show the terminal branches 221, 223, and 225 extended using adaptive region growing using an MV of 10 $mm^3$ and 20 $mm^3$ respectively. In image 230, terminal branches 231 and 233 are identified. Images 232 and 234 show the terminal branches 231 and 233 extended using adaptive region growing using an MV of 10 $m^3$ and 20 $mm^3$, respectively.

Another possible segmentation method for implementing the branch extension is differential adaptive region growing. This method is similar to the adaptive region growing method, but it includes an additional parameter. In order for a candidate voxel to be included in the segmentation in the differential adaptive region growing method, the gray level of the candidate voxel must be between the two thresholds and the difference between the gray value of the candidate voxel and a neighboring voxel already included in the segmentation must be below a certain value. This additional constraint prevents the segmentation from growing into voxels with significantly higher or lower values than neighboring voxels.

Another possible segmentation method for implementing the branch extension is a fuzzy connectedness method. This method creates an affinity map for the segmentation, describing the probability of certain regions belonging to the segmentation. The map is created based on given seed points and parameters, including the mean gray level and variance of the object of interest. The final segmentation (branch extension) is obtained by thresholding the affinity map.

Figure 3A:
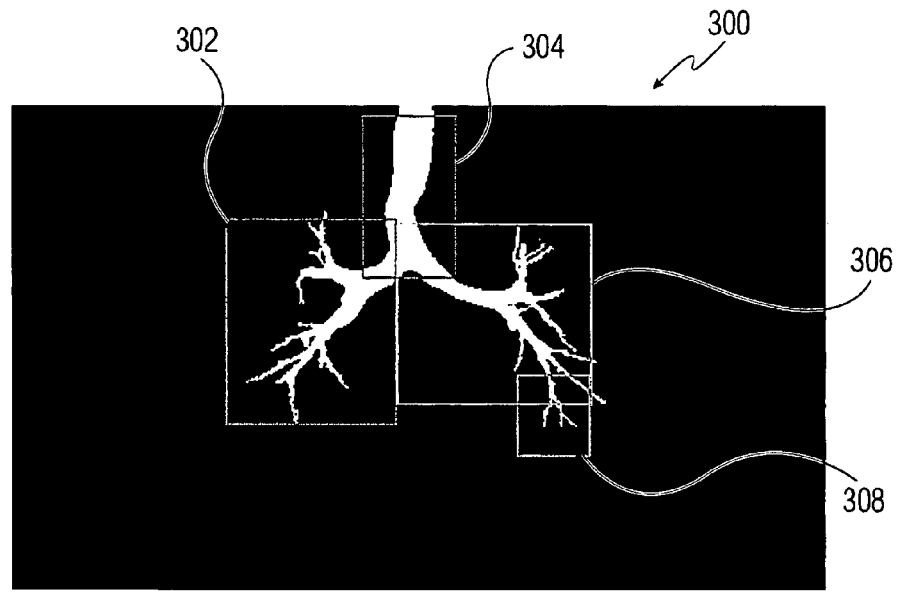
FIGS. 3A-3F illustrate exemplary segmentation results achieved using fuzzy connectedness branch extension

FIGS. 3A-3F illustrate exemplary segmentation results achieved using fuzzy connectedness branch extension. As illustrated in FIG. 3A, image 300 shows results of a branch extension using adaptive region growing. The branch extension result 300 was obtained from the initial airway segmentation 220 shown in FIG. 2 using adaptive region growing with an MV of 20 $mm^3$. As illustrated in FIG. 3A, image 300 is divided into regions 302, 304, 306, and 308. FIGS. 3B-3F show detailed views of branch extension results at regions 302, 304, 306, and 308 obtained using a fuzzy connectedness segmentation method in order to compare the fuzzy connectedness results to those obtained using adaptive region growing.

Figure 3B:
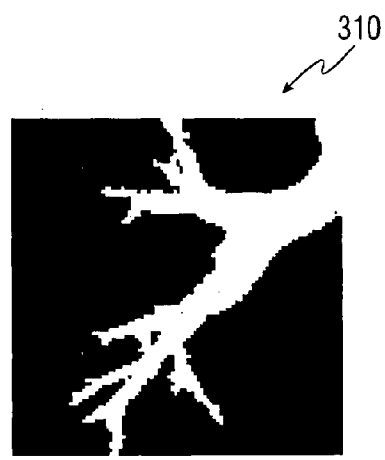

As illustrated in FIG. 3B, image 310 shows results of the fuzzy connectedness branch extension corresponding to region 302 of FIG. 3A. Image 310 was obtained using the fuzzy connectedness segmentation method with a mean value of −1000 HU, a variance of 2500 $HU^2$ and a percentage threshold of 0.5.

Figure 3C:
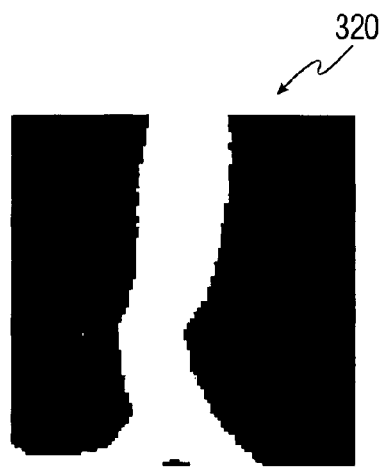

As illustrated in FIG. 3C, image 320 shows the results of the fuzzy connectedness branch extension corresponding to region 304 of FIG. 3A. Image 320 was obtained using the fuzzy connectedness segmentation method with a mean value of −1000 HU, a variance of 500 $HU^2$ and a percentage threshold of 0.2. Although many false branches were detected in the trachea, no extension occurred in the fuzzy connectedness branch extension result 320 or in the adaptive region growing branch extension result 300 for this region 304. This demonstrates the robustness of these methods to beginning the branch extension on false branches.

Figure 3D:
Figure 3E:
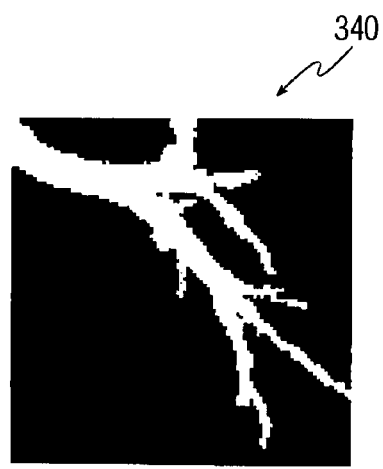

As illustrated in FIGS. 3D and 3E, images 330 and 340 show results of the fuzzy connectedness branch extension corresponding to region 306 of FIG. 3A. Images 330 and 340 were obtained from different starting terminal branch points using the fuzzy connectedness segmentation method with a mean value of −1000 HU, a variance of 2500 $HU^2$ and a percentage threshold of 0.5. As illustrated in FIGS. 3D and 3E, because of the different starting points, image 340 extends further than image 330.

Figure 3F:
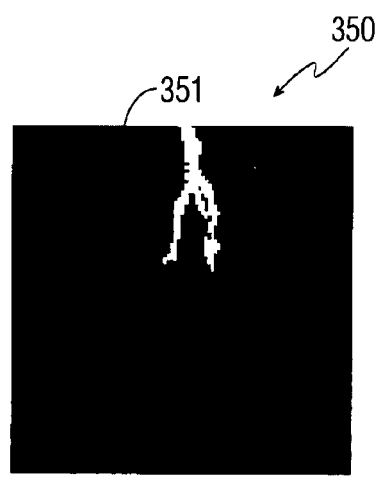

As illustrated in FIG. 3F, image 350 shows results of the fuzzy connectedness branch extension corresponding to region 308 of FIG. 3A. Image 350 was obtained using the fuzzy connectedness segmentation method with a mean value of −1000 HU, a variance of 2500 HU$^2$ and a percentage threshold of 0.2. Image 350 shows a branch 351 that is visible in image 300 of FIG. 3A, but not visible in images 330 and 340 of FIGS. 3D and 3E.

Another possible segmentation method for implementing the branch extension is branch tracking. Such methods track tubular objects starting from a given location and direction. In this case, the branch tracking method starts at a terminal branch in the same direction as the already extracted branch, and away from the rest of the extracted tree. Given the location and direction, the nearby image region is searched to find potential candidates for continuing airways. At a candidate, the method detects one of three situations: continuing airway, branching airway, and no airway. In the first two situations, the location and direction are updated with the newly found airway(s). The second of these two situations spawns an additional tracker for each branching airway. When stopping criteria are met, and no airways are found, the tracking stops.

As described above, the present invention is directed to a branch extension method for airway segmentation. Although this method is described for airway segmentation, this method can also be adapted for vessel segmentation from 3D image data. Furthermore, it is possible to repeat the above described method in an iterative process. A tree model can be used at the end of each iteration to ensure proper structure.

Figure 4:
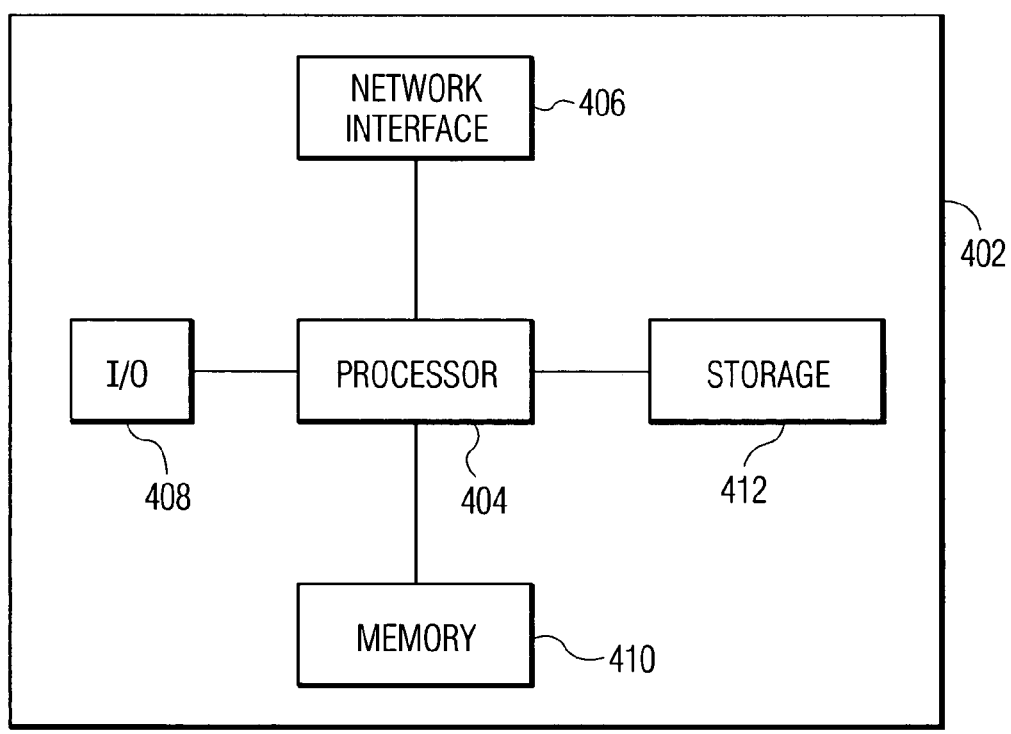
FIG. 4 illustrates a high level block diagram of a computer capable of implementing the present invention.

The branch extension methods described above can be implemented on a computer using well known computer processors, memory units, storage devices, computer software, and other components. A high level block diagram of such a computer is illustrated in FIG. 4. Computer 402 contains a processor 404 which controls the overall operation of the computer 402 by executing computer program instructions which define such operation. The computer program instructions may be stored in a storage device 412 (e.g., magnetic disk) and loaded into memory 410 when execution of the computer program instructions is desired. Thus, operations of the above describe methods can be defined by the computer program instructions stored in the memory 410 and/or storage 412 and controlled by the processor 404 executing the computer program instructions. Furthermore, the 3D image data as well as the airway segmentation and branch extension results can also be stored in the memory 410 and/or the storage. The computer 402 also includes one or more network interfaces 406 for communicating with other devices via a network. The computer 402 also includes input/output 408 which represents devices which allow for user interaction with the computer 402 (e.g., display, keyboard, mouse, speakers, buttons, etc.) One skilled in the art will recognize that an implementation of an actual computer will contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

What is claimed is:

1. A method comprising:
   obtaining 3D image data including segmented airways having a plurality of branches;
   identifying, by a processor, one or more of the plurality of branches of the segmented airways as terminal branches; and
   extending, by a processor, the segmentation of the identified terminal branches.

2. The method of claim 1, wherein said step of identifying one or more of the plurality of branches of the segmented airways as terminal branches comprises:
   generating a distance map of said segmented airways from the trachea; and
   identifying locally maximal regions on said distance map as terminal branches.

3. The method of claim 1, wherein said step of identifying terminal branches of the segmented airways comprises:
   generating a tree model of the segmented airways; and
   determining the terminal branches of the segmented airways based on the tree model.

4. The method of claim 1, wherein said step of extending the segmentation of the identified terminal branches comprises:
   extending the segmentation of the terminal branches using adaptive region growing segmentation.

5. The method of claim 1, wherein said step of extending the segmentation of the identified terminal branches comprises:
   extending the segmentation of the terminal branches using differential adaptive region growing segmentation.

6. The method of claim 1, wherein said step of extending the segmentation of the identified terminal branches comprises:
   extending the segmentation of the terminal branches using fuzzy connectedness segmentation.

7. The method of claim 1, wherein said step of extending the segmentation of the identified terminal branches comprises:
   extending the segmentation of the terminal branches via branch tracking at the identified terminal branches.

8. The method of claim 1, wherein said step of obtaining 3D image data including segmented airways comprises:
   receiving 3D image data; and
   segmenting airways in the 3D image data.

9. A method comprising:
   segmenting, by a processor, airways in 3D image data using a first segmentation technique, wherein the segmented airways resulting from the first segmentation technique have a plurality of branches;
   identifying, by a processor, one or more of the plurality of branches of the segmented airways resulting from said first segmentation technique as terminal branches; and
   extending, by a processor, the identified terminal branches by performing segmentation at the terminal branches using a second segmentation technique.

10. An apparatus comprising:
    means for obtaining 3D image data including segmented airways having a plurality of branches;
    means for identifying one or more of the plurality of branches of the segmented airways as terminal branches; and
    means for extending the segmentation of the identified terminal branches.

11. The apparatus of claim 10, wherein said means for identifying one or more of the plurality of branches of the segmented airways as terminal branches comprises:
  means for generating a distance map of said segmented airways from the trachea; and
  means for identifying locally maximal regions on said distance map as terminal branches.

12. The apparatus of claim 10, wherein said means for identifying terminal branches of the segmented airways comprises:
  means for generating a tree model of the segmented airways; and
  means for determining the terminal branches of the segmented airways based on the tree model.

13. The apparatus of claim 10, wherein said means for extending the segmentation of the identified terminal branches comprises:
  means for performing adaptive region growing segmentation at the identified terminal branches.

14. The apparatus of claim 10, wherein said means for extending the segmentation of the identified terminal branches comprises:
  means for performing differential adaptive region growing segmentation at the identified terminal branches.

15. The apparatus of claim 10, wherein said means for extending the segmentation of the identified terminal branches comprises:
  means for performing fuzzy connectedness segmentation at the identified terminal branches.

16. The apparatus of claim 10, wherein said means for extending the segmentation of the identified terminal branches comprises:
  means for performing branch tracking at the identified terminal branches.

17. The apparatus of claim 10, wherein said means for obtaining 3D image data including segmented airways comprises:
  means for receiving 3D image data; and
  means for segmenting airways in the 3D image data.

18. An apparatus comprising:
  means for segmenting airways in 3D image data using a first segmentation technique, wherein the segmented airways resulting from the first segmentation technique have a plurality of branches;
  means for identifying one or more of the plurality of branches of the segmented airways resulting from said first segmentation technique as terminal branches; and
  means for extending the identified terminal branches by performing segmentation at the terminal branches using a second segmentation technique.

19. A non-transitory computer readable medium storing computer program instructions, said computer program instructions defining the steps comprising:
  identifying one or more of a plurality of branches of segmented airways in 3D image data including an airway segmentation as terminal branches; and
  extending the segmentation of the identified terminal branches.

20. The computer readable medium of claim 19, wherein the computer program instructions defining the step of identifying one or more of a plurality of branches of the segmented airways in 3D image data including an airway segmentation as terminal branches comprise computer program instructions defining the steps of:
  generating a distance map of said segmented airways from the trachea; and
  identifying locally maximal regions on said distance map as terminal branches.

21. The computer readable medium of claim 19, wherein the computer program instructions defining the step of identifying terminal branches of the segmented airways comprise computer program instructions defining the steps of:
  generating a tree model of the segmented airways; and
  determining the terminal branches of the segmented airways based on the tree model.

22. The computer readable medium of claim 19, wherein the computer program instructions defining the step of extending the segmentation of the identified terminal branches comprise computer program instructions comprising the step of:
  extending the segmentation of the terminal branches using adaptive region growing segmentation.

23. The computer readable medium of claim 19, wherein the computer program instructions defining the step of extending the segmentation of the identified terminal branches comprise computer program instructions comprising the step of:
  extending the segmentation of the terminal branches using differential adaptive region growing segmentation.

24. The computer readable medium of claim 19, wherein the computer program instructions defining the step of extending the segmentation of the identified terminal branches comprise computer program instructions comprising the step of:
  extending the segmentation of the terminal branches using fuzzy connectedness segmentation.

25. The computer readable medium of claim 19, wherein the computer program instructions defining the step of extending the segmentation of the identified terminal branches comprise computer program instructions comprising the step of:
  extending the segmentation of the terminal branches via branch tracking at the identified terminal branches.

26. A non-transitory computer readable medium storing computer program instructions, said computer program instructions defining the steps comprising:
  segmenting airways in 3D image data using a first segmentation technique, wherein the segmented airways resulting from the first segmentation technique have a plurality of branches;
  identifying one or more of the plurality of branches of the segmented airways resulting from said first segmentation technique as terminal branches; and
  extending the identified terminal branches by performing segmentation at the terminal branches using a second segmentation technique.

* * * * *